(No Model.)

S. F. WOODWORTH.
PLOW.

No. 262,716.  Patented Aug. 15, 1882.

Witnesses:
E. W. Tuelor
Ernest F. Tabor

Inventor:
Silas F. Woodworth

UNITED STATES PATENT OFFICE.

SILAS F. WOODWORTH, OF NEW CASTLE, CALIFORNIA.

PLOW.

SPECIFICATION forming part of Letters Patent No. 262,716, dated August 15, 1882.

Application filed July 23, 1881. (No model.)

*To all whom it may concern:*

Be it known that I, SILAS F. WOODWORTH, a citizen of the United States, residing at New Castle, in the county of Placer and State of California, have invented a new and useful Reversible Plow, of which the following is a specification.

My invention relates to improvement in reversible plows; and the objects of my improvements are, first, to provide a reversible plow that will turn a furrow uphill, so as to maintain the same depth of soil over those roots of a tree that extend downhill from its trunk as over those upon its upper side, in contradistinction to the ordinary side-hill plow, which is incapable of turning a furrow except downhill, and of necessity piles the dirt against the tree upon its uphill side and plows it away from the lower side, leaving the tree upon the brink of a terrace, with its lower roots exposed and mutilated; second, to produce a reversible plow whose standard shall be vertical, while the landside shall be at right angles to the plane of the hill and its bottom or share parallel to the plane of the hill, while turning a furrow uphill, in contradistinction to the ordinary plow, whose bottom is at right angles to the standard, necessitating an inclined position of the standard while turning a furrow uphill; third, to provide a reversible plow whose landside shall have the proper divergence from the line of the beam to secure the desired width of furrow without adjusting the clevis; fourth, to produce a reversible plow having a right-hand and left-hand mold-board that may be used interchangeably upon the same share or point, (which is common to both,) or, when desired, with one mold-board only, thus forming a simple right or left hand plow, capable of being used as such without being incumbered by the weight of the other mold-board, together with its standard, landside, and share, as is the case with former existing reversible plows having a right and left hand mold-board in connection with two shares pointing in opposite directions, and two landsides, being simply two plows placed back to back. I attain these objects by mechanism illustrated in the accompanying drawings, in which—

Figure 1:
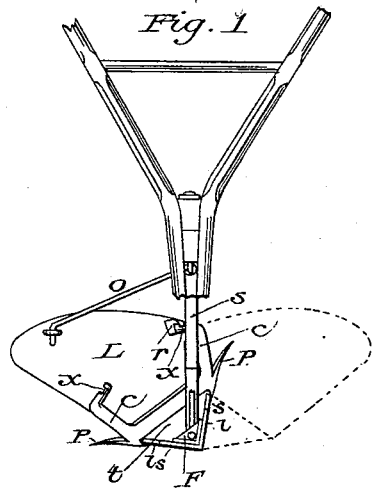
Figure 2:
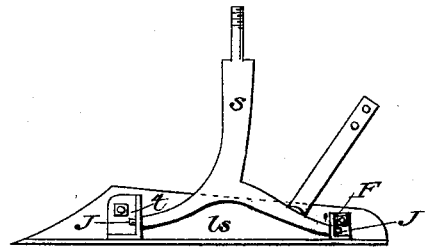
Figure 3:
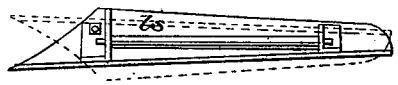
Figure 5:
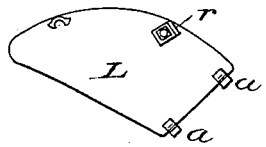
Figure 6:
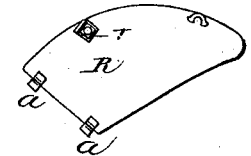
Figure 4:
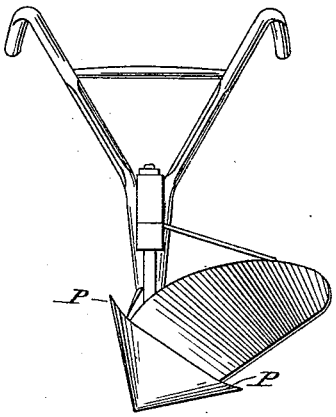

Figure 1 is a rear view, showing the left-hand mold-board in position, the standard vertical, and the rear end of share raised above the level of the bottom of the landside. Fig. 2 shows a side view of the standard, handle-brace, and landside, with share and mold-board removed. Fig. 3 is a top view of landside and standard in position for the right-hand mold-board. The dotted lines show it reversed for the left-hand mold-board. This view also shows the device by which land is secured. Fig. 4 is a front view of the plow with its left-hand mold-board in position, showing by dotted lines the position of the right-hand mold-board when the left-hand mold-board is removed and the share oscillated to the right for that purpose. Figs. 5 and 6 are representations of the backs of the left-hand and right-hand mold-boards with lugs *a a*.

Similar letters refer to similar parts throughout the several views.

The standard S, Fig. 2, may be made of wrought, malleable, or cast iron, or steel, (preferably steel) and provided with the short journals J J at its lower front and rear extremities.

The landside *l s* may be made of cast-iron, sheet-steel, or cast cast-steel, (preferably the latter,) with one face at about right angles to the other, (so that while one face serves as a landside the other acts as a bottom, and vice versa,) and sufficiently wide at the front end to completely shield the frog *f* and necessary bolts from contact with the bottom of the furrow and from contact with the land, thus avoiding, especially in adobe or adhesive soils, the lifting out of the plow caused by such soils accumulating and being impacted upon the exposed bolts, nuts, brace, frog, and unfinished or unpolished bottom surfaces of ordinary plows.

The standard S and angle-landside *l s* are attached together by the front and rear frogs, *f* and F, (see Fig. 1) which are fastened to the landside by plow-bolts, and are connected to the standard by holes fitting the journals J J, Fig. 2. This pivot-point at J J permits either angle of the landside to be brought into position—*e. g.*, to the right of the standard for a left-hand plow or to the left of the standard for a right-hand plow.

The share P P is placed in position and firmly attached to the landside by means of a slight socket upon its lower surface, near its point, fitting over the pointed front extremity of the landside, and is further secured in position by means of two plow-bolts connecting its rear end to the arms C C of the front frog, f. This front frog, f should be made of malleable iron or struck up out of sheet-steel in a "drop" provided with proper dies; and its arms C C extend back and upward in such a position as to come just under the shin of the mold-board, their rear ends being turned inward in position to extend through the standard, (by means of a hole near its front edge,) presenting the notch x upon the opposite side of the standard. The rear frog, F, may be made of sheet-steel or malleable-iron, with hole for journal J, and flanges whereby to bolt it to the angles of the landside.

The mold-boards, Figs. 5 and 6, may be made of any desirable material adapted to the locality in which they are to be used, and in the forms most approved for the special service required of them—e. g., of a bold or somewhat abrupt angle for loose loam or a longer sharper angle for sod and heavy soils; or, if desirable, two or more forms of mold-board may be fitted to the same plow.

The mold-boards are provided with the lugs a a a a upon their lower side at the front end and in such position as to pass through the arms C C, thus forming a most simple and effective connection between the mold-board and the share. The mold-boards must further be provided with the short arm or pawl r, which assumes a bearing in the notch x, and, being held down firmly in the notch by the hook-brace o, rigidly locks the several parts in position, when it is ready for service.

To reverse the plow the hook-brace o is detached, when the mold-board is readily lifted out of its position. This allows the share and landside to be (see dotted lines, Figs. 3 and 4) reversed or oscillated upon the journals J J until the other arm C comes in contact with the standard projecting through it and presenting the necessary bearings for the mold-board, which is readily dropped into position, and the several parts are firmly locked together by the hook-brace o, thus attaining the fourth object of my invention.

The third object is attained by means of placing the hole in the rear frog, F, (for journal J,) close to the landside, while the bearing in the front frog, f, (for the journal J,) is at a greater distance from the landside, thus causing the line of the landside to diverge from the line of the beam, as shown by Fig. 3.

The second object is attained by the arms C C coming in contact with the side of the standard S when the share (while being oscillated or reversed) arrives at the exact position desired, retaining it in this position, with its bottom forming an acute angle to the vertical of the standard. (See Fig. 1.)

I am aware that prior to my invention reversible plows have been made by connecting together a right and a left hand plow "back to back," having two shares pointing in opposite directions at the extremities of a landside of double the length required for one plow, each plow having a standard, the tops of which were connected by a "cap-piece" and pivoted to a beam by means of a bolt, the two plows being undetachable from each other, thus encumbering the team and plowman with more than double the weight and the manufacturer with double the expense for material required in this my present invention. I therefore do not claim a reversible plow with two mold-boards, broadly; but What I do claim as my invention, and desire to secure by Letters Patent, is—

1. The combination, in a reversible plow, of the share or point P, adapted to receive either mold-board right or left, the pivoted landside l s, the notched arms C C, and standard S, substantially as described.

2. The combination, in a reversible plow, of the angular landside l s, journals J J, frogs f and F, and standard S, substantially as described.

3. The combination, in a reversible plow, of the point P, adapted to receive the lugs a a, and arms C C, having notches x x to engage with the lugs r, substantially as and for the purpose specified.

SILAS F. WOODWORTH.

Witnesses:
F. H. HOWELL,
H. D. ALBEE.